United States Patent [19]
Harrington

[11] Patent Number: 5,623,828
[45] Date of Patent: Apr. 29, 1997

[54] THERMOELECTRIC AIR COOLING DEVICE

[76] Inventor: Steven S. Harrington, 5158 Clareton, Agoura Hills, Calif. 91301

[21] Appl. No.: 626,144

[22] Filed: Apr. 5, 1996

[51] Int. Cl.$^6$ .......................... F25B 21/02; F25D 17/04; F25D 17/06
[52] U.S. Cl. .................. 62/3.2; 62/3.6; 62/3.61; 62/407; 62/412
[58] Field of Search .................. 62/3.2, 3.3, 3.6, 62/3.61, 3.62, 239, 244, 404, 407, 410, 411, 412, 426, 427; 165/80.3; 136/203

[56] References Cited

U.S. PATENT DOCUMENTS

| | | | |
|---|---|---|---|
| 4,905,475 | 3/1990 | Tuomi | 62/3.3 |
| 4,955,203 | 9/1990 | Sundhar | 62/3.61 |
| 5,193,347 | 3/1993 | Apisdorf | 62/3.6 |

FOREIGN PATENT DOCUMENTS

| | | | |
|---|---|---|---|
| 749700 | 7/1980 | U.S.S.R. | 62/3.61 |
| 941799 | 7/1982 | U.S.S.R. | 62/3.3 |
| 1558716 | 4/1990 | U.S.S.R. | 62/3.2 |

*Primary Examiner*—William Doerrler

[57] ABSTRACT

A thermoelectric cooler (TEC) with attached heat sinks centrally positioned at the discharge of a blower and in turn mounted in an enclosure to provide a supply of cooled air to the driver or passenger of a vehicle. A blower/motor assembly produces a steady flow of air, a fraction of which is directed over the hot side of the TEC where it removes heat with the aid of a high efficiency heat sink disposed within the air stream. This air is exhausted to the ambient, away from the person. The remaining fraction of air discharged from the blower is directed to the cold side of the TEC where it is cooled with the aid of a high efficiency heat sink. The cooled air exits the enclosure and is blown on the head and face of the person for the purpose of cooling and personal comfort. Power is provided by a jack that is to be inserted in a cigarette lighter socket. A clip is operable to mount said enclosure to the sun shade of a vehicle in close proximity to the persons head and face where greatest efficiency and cooling effect is achieved.

10 Claims, 5 Drawing Sheets

THERMOELECTRIC AIR COOLING DEVICE

BACKGROUND OF THE INVENTION

The closed environment of a vehicle interior, whether it be a car, plane, train, etc., poses a great challenge in temperature control and personal comfort of the occupants. In hot climates the interior ambient of an unconditioned vehicle can reach temperatures well over 100 Fahrenheit. Even on mildly warm days, when the car is exposed to direct sunlight, the temperature of a vehicle cab can rise to very uncomfortable levels. Under these conditions there is a great need for an air conditioning system to cool the air and improve the personal comfort of the driver or passenger in the vehicle.

The conventional method used today to cool the interior compartment of a transportation vehicle is a mechanical air conditioning system. By this means, a refrigerant is compressed, condensed, expanded and evaporated to produce a cooling effect. It is widely used and it is a well established system. It requires large, heavy mechanical components and can produce a large amount of cooling with a likewise large amount of energy consumption. The system is designed to cool the entire cab of the vehicle.

Common in aircraft is a compressed air system. In this system air is compressed and expanded to create a cooling effect. Components are large and heavy and create a large amount of cooling at the cost of high energy consumption.

These large systems drain the engine of performance and reduces the gas mileage by as much as 20%. They are inefficient in the sense that they cool the entire interior space, resulting in cool areas where no occupant is present.

There are a number of reasons why a vehicle may be manufactured without an air conditioning system. Weight limitation, as with electric cars, small airplanes or helicopters, will restrict the use of heavy components of a mechanical system. Another reason may be the high cost of installation and components of a mechanical air conditioning system. Still another reason may be space restrictions. Mechanical air conditioning systems have many moving parts that are susceptible to failure. Refrigerant leakage through the hoses and broken belts are likely. They must be properly adjusted to run efficiently and break down is common if not inevitable. In addition, the mechanical air conditioning system that runs on yesterdays CFC type refrigerants faces obsolescence. The 1987 Montreal protocol adopted by the United States and many other countries bans the production of the most common refrigerants.

The invention deals with the problem of how to relieve a person of the uncomfortable environment that a vehicle without air conditioning can create. Presently, a broken down mechanical air conditioning system would require one of two alternatives: repair the CFC system or retrofit for non-CFC refrigerant. Both alternatives can be costly. In addition, repairing a CFC system means dealing with tightening supplies and rising prices of reclaimed CFC's. Retrofitting a systems tends to reduce the performance and cooling capacity. Another approach, if available and feasible, is to install an aftermarket system in the vehicle. This would be a full mechanical non-CFC system designed specifically for that vehicle and would certainly provide the cooling requirements. However, with automobiles for example, one typically cannot justify the exorbitant cost associated with installation of an air conditioning system, especially when the cost is compared to the depreciated value of the vehicle. Furthermore, the typical short time period of vehicle ownership deters one from taking on this expense. Another available option to lessen the effect of the heat is to purchase any number of available fans that are available on the market today. These are small, axial type fans that are either battery operated or run off the vehicle power. Albeit this is a cheap solution, these fans do not produce any active cooling and they fall far short of an acceptable cooling method. Consequently, many vehicles on the road are running absent an air conditioning system.

Driving in a car without air conditioning on a hot summer day is a miserable situation experienced at least once by most people. This is were the idea for the invention originated. Desperate to find some relief from the heat, it became apparent that no device existed that would adequately solve the problem of overheated vehicle occupants. Some sort of cooling means that was small portable, lightweight, inexpensive and actually produced a real cooling effect was needed. However, nothing was available that completely satisfied this need.

The cooling effect of a small stream of cool air directed on the face and head of an occupant can significantly improve the comfort of the individual. This phenomenon is disclosed in U.S. Pat. No. 5,193,347. The cooling air need only be approximately 8 degrees Fahrenheit below ambient, and a flow rate of approximately 6 cfm. Taking advantage of this phenomenon and applying it to a vehicle, it becomes unnecessary to cool the entire cab and no net cooling is required; adequate heat relief relies on the efficiency of cooling only the space around the occupant. The invention described herein provides such a cooling capacity and satisfies the requirement for the device to be in dose proximity to the head and face of the occupant.

BRIEF SUMMARY OF THE INVENTION

The present invention disclosed and claimed herein comprises a low voltage motor, blower, low voltage thermoelectric cooler (TEC), hot side heatsink, cold side heatsink, plastic enclosure, switch, mounting clip, power cord, jack and insulating material. The arrangement of said components devise a portable, personal cooling device that is powered by a cigarette lighter of a vehicle and mounted to the sun shade of said vehicle to advantageously produce cool air on the persons face and head. Said plastic enclosure houses the components and forms the cavity in which blower discharged air travels over said TEC with attached heat sinks. One heat sink is mounted to each side of the TEC with thermal cement at the interface to enhance heat transfer. The TEC and Heatsink combine to make a heat exchanger which is strategically positioned at the discharge of the blower where air is divided by an air diverter into the proper ratio to produce the maximum cooling. A portion of air passes over disposed hot side heatsink where heat is abstracted and the temperature rises. The air is directed to an opening in the enclosure where it is discharged from the enclosure, away from the person. The remaining portion of air passes over disposed cold side heatsink where heat is withdrawn and the temperature is consequently lowered. This air is directed to an opening in the enclosure where it is discharged on to the person.

The heat sinks are both comprised of an aluminum plate and thin gauge copper fins. Spacing between fins and height thereof, are such that they optimize maximum air flow and minimum air pressure drop with high heat transfer surface area. The height of the fins define the portion of air received from the blower. The cold heat sink fins are arranged in an 'L' shaped fashion to direct the air from the blower to the opening in the enclosure where it is discharged on the person. The hot heatsink fins are arranged in a 'Z' shaped fashion to direct the air from the blower to the opening in the enclosure where it is exhausted away from the person. Insulating material is wrapped around the cold heat sink to prevent heat gain. A On-Off switch is mounted on the front of the enclosure to energize the blower and TEC. A power cord with attached jack extends from the rear of the device.

The invention is capable of producing approximately 6 scfm of air from the cold side at a temperature of approximately 10 degrees Fahrenheit below ambient. The hot side produces approximately 8 scfm at a temperature of approximately 10 degrees Fahrenheit above ambient. The device is operable at a voltage of 7–14 volts dc and is optimized to produce a fixed cooling capacity and a fixed air flow. No means of temperature control is necessary or provided.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE DRAWING

Figure 1:
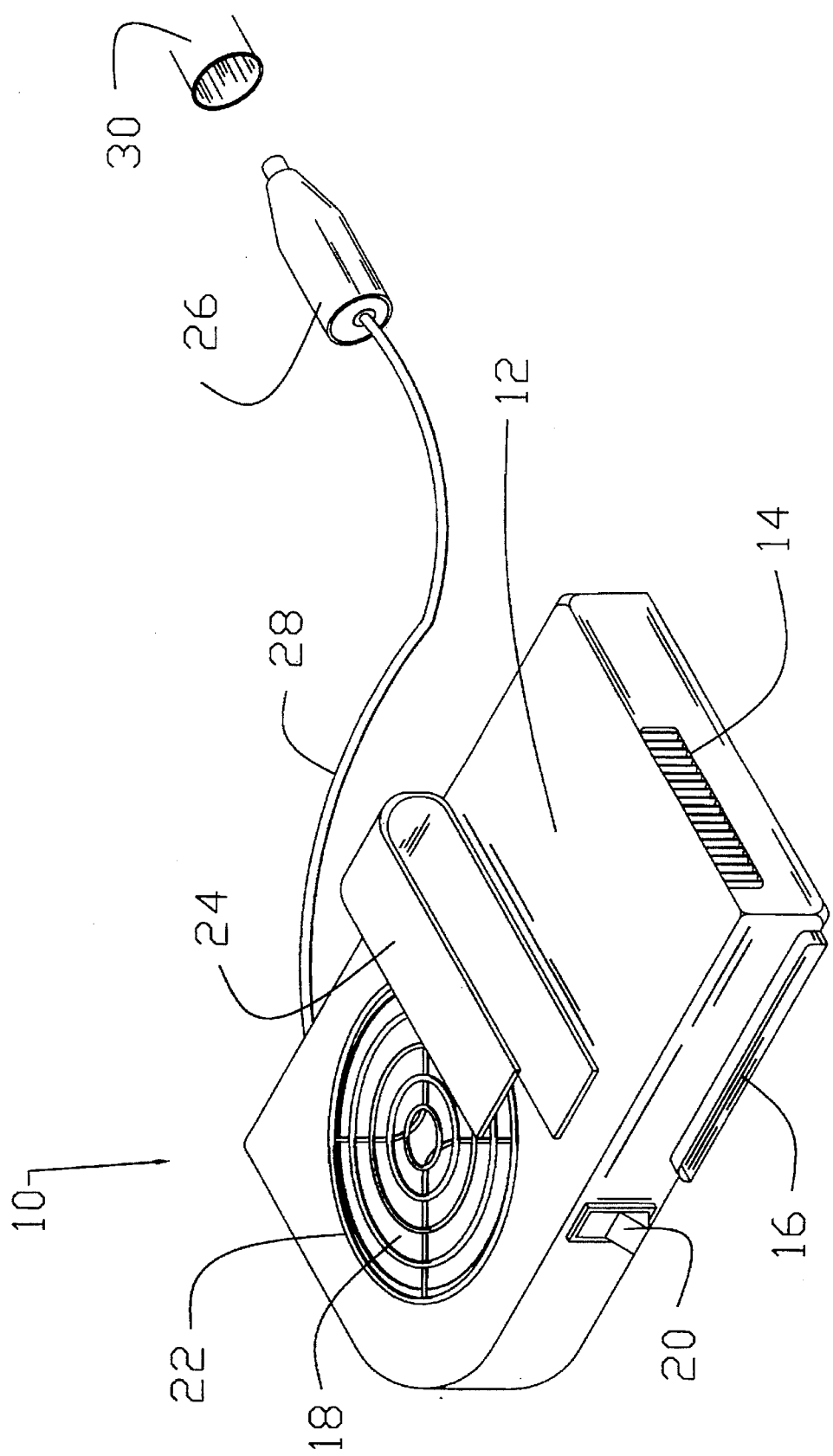
FIG. 1 illustrates a perspective view of a preferred embodiment of the invention.

Referring now to FIG. 1 there is illustrated a perspective view of the general arrangement of the present invention. The invention is generally represented by a reference numeral 10. It is comprised of an enclosure 12 having a cavity contained therein, with intake opening 18 and fan guard 22 on the top face, intake opening 17 and fan guard 23 (not shown) on the bottom face, hot air exhaust 14 (with directional grille) and cold air discharge 16 (with diffuser) on adjacent side walls. On the front side wall of the enclosure 12 there is mounted therein a ON-OFF switch 20 and attached on the top face is a mounting clip 24. The invention 10 has associated adjacent the enclosure 12 a jack 26 connected by wire 28. Jack 26 is a conventional design for connecting to vehicle battery power through cigarette socket 30. Cigarette socket 30 is standard in most U.S. and foreign autos. The Jack 26 is operable to be inserted into the socket 30 and make electrical contact to supply power thereto.

Figure 2:
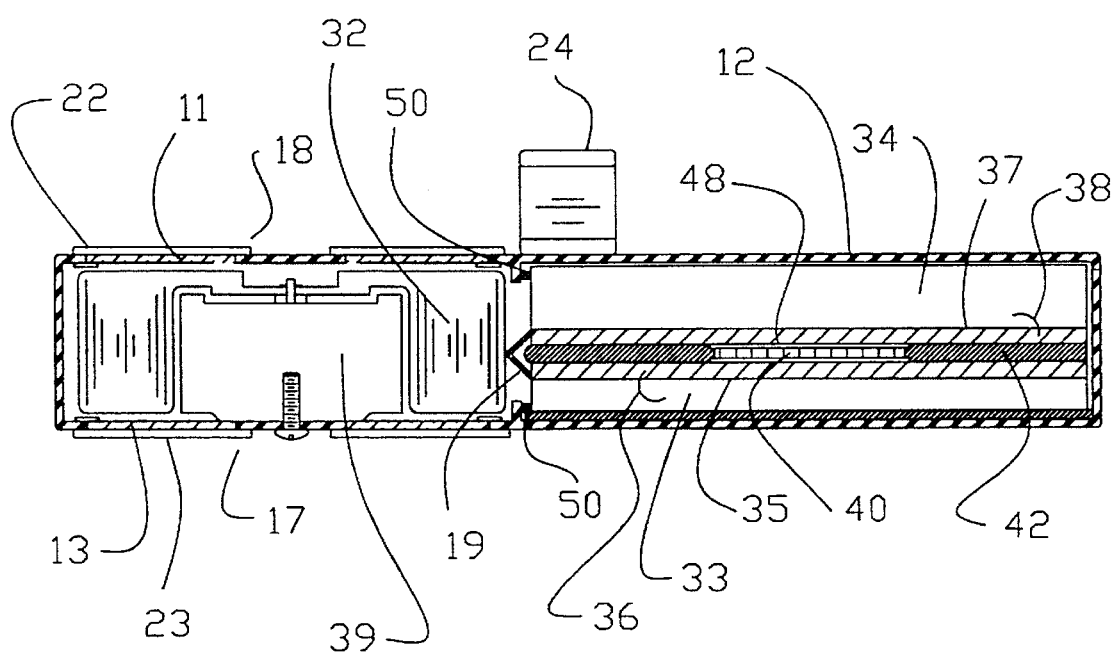
FIG. 2 illustrates a cross-sectional side view of the invention.

Referring now to FIG. 2, there is illustrated a cross-sectional view of the invention, showing how the major components are arranged in the preferred embodiment. The enclosure 12 is preferably of a light weight thermoset material having intake ports 17 and 18 with demountably disposed air filters 11 and 13 for filtering incoming air. Fan guards 22 and 23 are of typical design for protection from rotating blades. Blower 32, powered by motor 39, is fixedly attached to the inside of enclosure 12 and is oriented so that it draws air through intake ports 17 and 18 and discharges the air through, and in parallel direction thereto, the hot heat sink fins 34 and cold heat sink fins 33. Vapor seal 50 is operable to prevent air leakage through the interface of the blower discharge and the heat sinks. Air diverter 19 is operable to divide the singular air source into two flow streams, a hot side air stream and a cold side air stream. Air diverter 19 minimizes pressure loss associated with dividing the air flow. Motor and blower assembly is preferably rated for high static pressure operable to produce 23 cfm of air at rated pressure and 500 mA current draw. Flow restriction due to the high efficient heat sink assemblies 36 and 38, which will be described herein below, reduces actual flow to a range of 12 to 16 cfm. It is the function of the blower to force air through the heat sink fins 33 and 34 and discharge the air out of hot air exhaust 14 and cold air discharge 16 (FIG. 1). Mounting clip 24 affixed to the top of the enclosure is operable to attach the invention to a sun shade or any other suitable device affording close proximity to the person.

Figure 3:
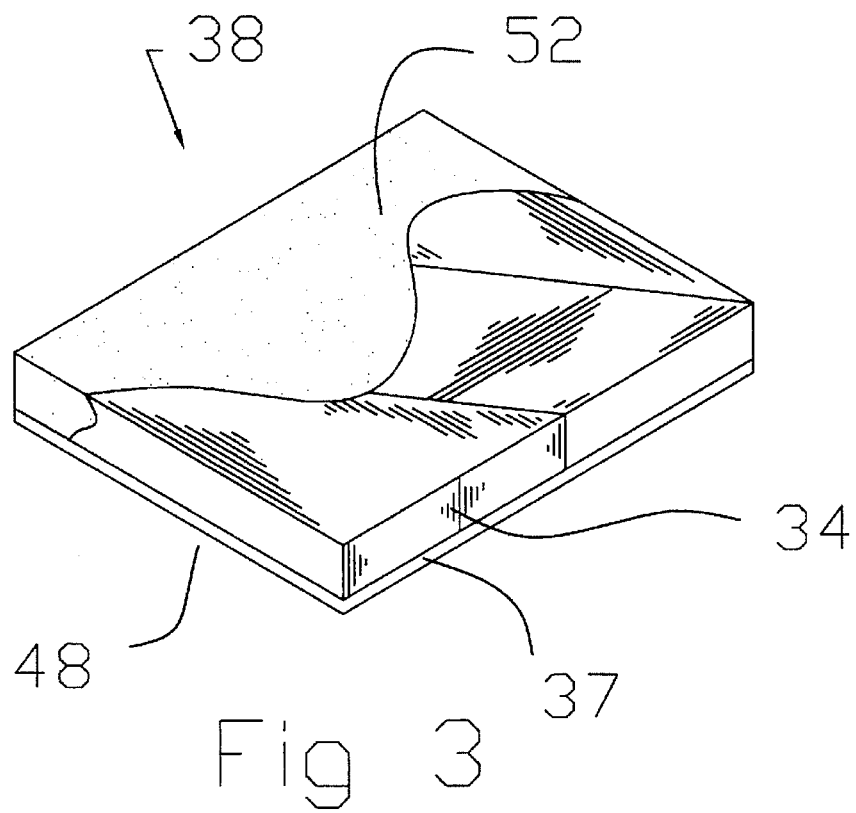
FIG. 3 illustrates a perspective view of the hot heat sink in the preferred embodiment.

Referring now to FIG. 3 wherein hot heat sink 38 is illustrated in the preferred embodiment. Hot heat sink 38 is comprised of a thermal distributor plate 37 of aluminum material having a thickness of 0.125 inches (0.32 cm) a length of 4.375 inches (11.11 cm) and width of 3.5 inches (8.89 cm). Fixedly attached perpendicularly to thermal distributor plate 37, with conductive cement material 48, are a plurality of mutually parallel heat conducting fins 34, previously referred to as heat sink fins. Fins 39 are preferably constructed of high conductive material 0.005 to 0.008 inches (0.013 to 0.020 cm) thick, approximately 0.5 inches (1.27 cm) in height and spaced less then 0.08 inches (0.020 cm) apart. Fins 34 conform to a 'Z' shape geometry to facilitate the ducting of air from the blower discharge to the hot air exhaust 14 of FIG. 1. Shroud 52 is light foil material and is operable to enclose fin arrangement and create the flow envelope in which the air will pass.

Figure 4:
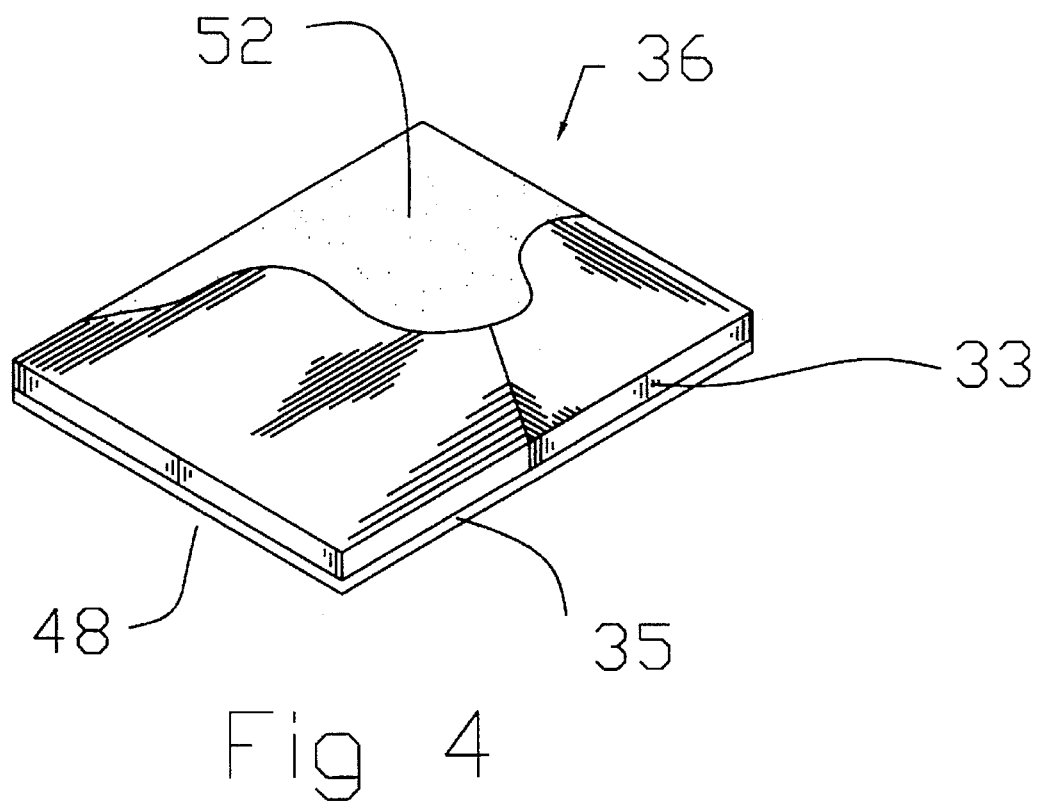
FIG. 4 illustrates a perspective view of the cold heat sink in the preferred embodiment.

Referring now to FIG. 4 wherein cold heat sink 36 is illustrated in the preferred embodiment. Cold heat sink 36 is comprised of a thermal distributor plate 35 of aluminum material having a thickness of 0.125 inches (0.32 cm), a length of 4.375 inches (11.11 cm) and width of 3.5 inches (8.89 cm). Fixedly attached perpendicularly to thermal distributor plate 35, with conductive cement material 48, are a plurality of mutually parallel fins 33. Fins 33 are preferably constructed of high conductive material 0.005 to 0.008 inches (0.013 to 0.020 cm) thick, approximately 0.25 inches (0.64 cm) in height and spaced less then 0.08 inches (0.02 cm) apart. Fins 33 conform to an 'L' shape geometry to facilitate the ducting of air from the blower discharge to the cold air discharge 16 of FIG. 1. Shroud 52 is a light foil material and is operable to enclose fin arrangement and create the flow envelope in which the air will pass.

The dense fin arrangement and high conductive material of hot heat sink 38 and cold heat sink 36 work advantageously to efficiently transfer heat and significantly improve thermal performance over standard extruded heat sinks. The height of fins 33 and 34 determine the respective flow area and act to establish the ratio of mass flow of air distributed through hot heat sink 38 and cold heat sink 36 from the blower 32. This ratio of air through the heat sinks is operable to optimize cooling performance. Insulation 42 (FIG. 2) is of high thermal resistant material to prevent heat leakage from the cold side of the device to the hot side. Insulation 42 extends around the peripheral of cold heat sink 36 to reduce heat intrusion and hot heat sink 38 is left un-insulated so as to not hinder heat dissipation to the ambient.

Referring now again to FIG. 2, there is illustrated a solid state heat pump, commonly known as a thermoelectric cooling element (TEC) 40, dividing heat sinks 36 and 38. TEC 40, in the conventional operation thereof, is operable to "pump" heat from a cold side to a hot side when a low power electric current is passed through it. An ITI FerroTec model number 6300/127/060 is used in the preferred embodiment producing a heat pumping capacity of approximately 25 Watts at operating conditions. In the present invention it is the purpose of the cold side of TEC 40 to extract heat from the air passing through cold heat sink 36, wherein said heat sink is operable to enhance heat transfer, while it is the purpose of the hot side of the TEC 40 to dissipate this heat to the air passing through hot heat sink 38, wherein said heat sink is likewise operable to enhance heat transfer. Cold and hot side surfaces of TEC 40 are in intimate contact with thermal distributor plates 35 and 37 wherein thermal cement 48 is employed to fill any minute void space therein and enhance thermal conductivity thereto.

Figure 5:
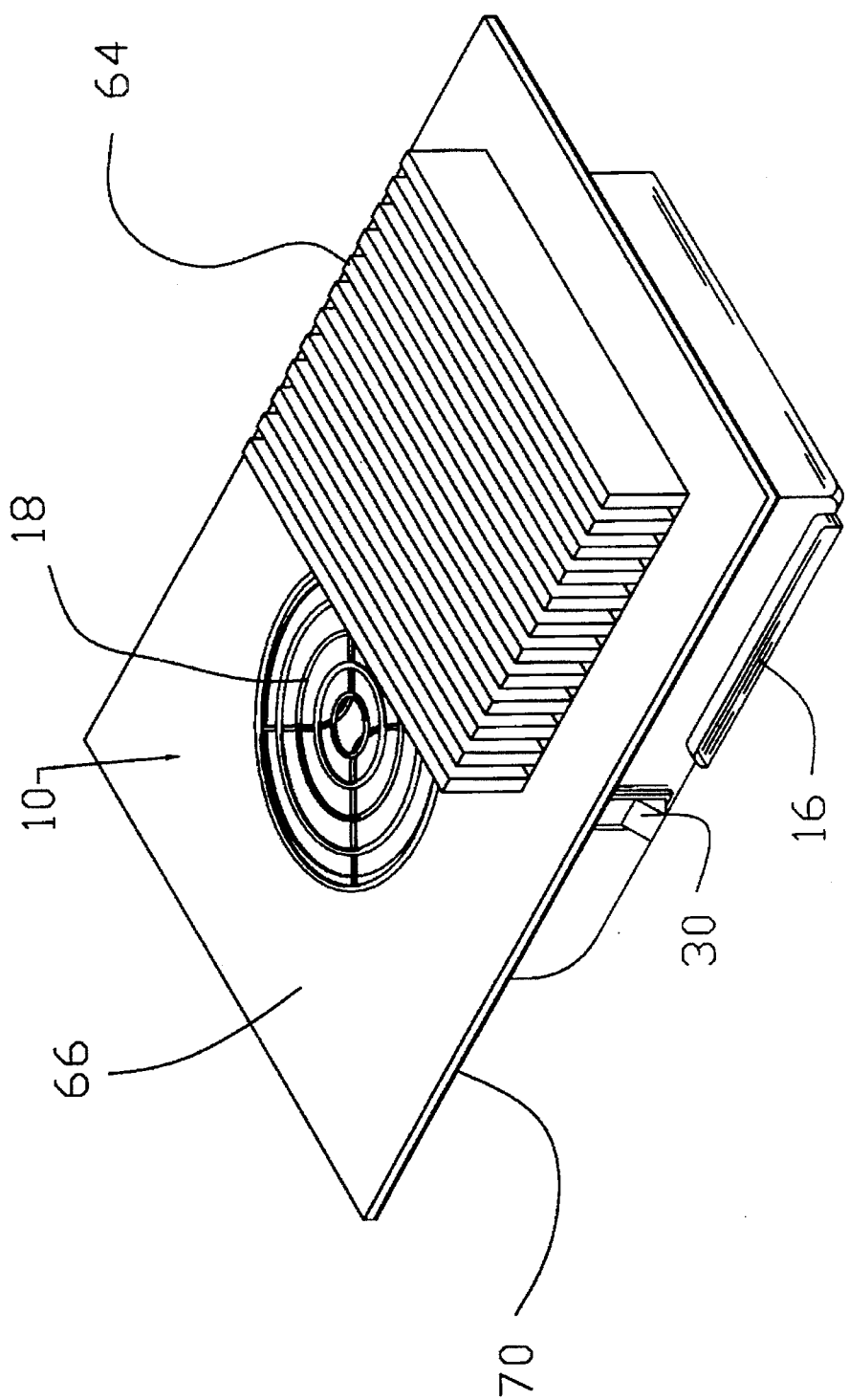
FIG. 5 illustrates an alternate embodiment of the invention of FIG. 1 depicting an external heat sink mountable through the wall of a vehicle.

Referring now to FIG. 5, there is illustrated an alternate embodiment of the present invention wherein hot heat sink 64 and fan blower intake port 18 extend through the vehicle wall (ceiling) or dashboard. Flange 66 is operable for mounting the unit to the outside surface of a vehicle with gasket 70 providing a leak free seal. The size of hot heat sink 64 is now substantially larger and of conventional extruded design. Intake port 68 withdraws fresh outside ambient air providing improved personal comfort.

Figure 6:
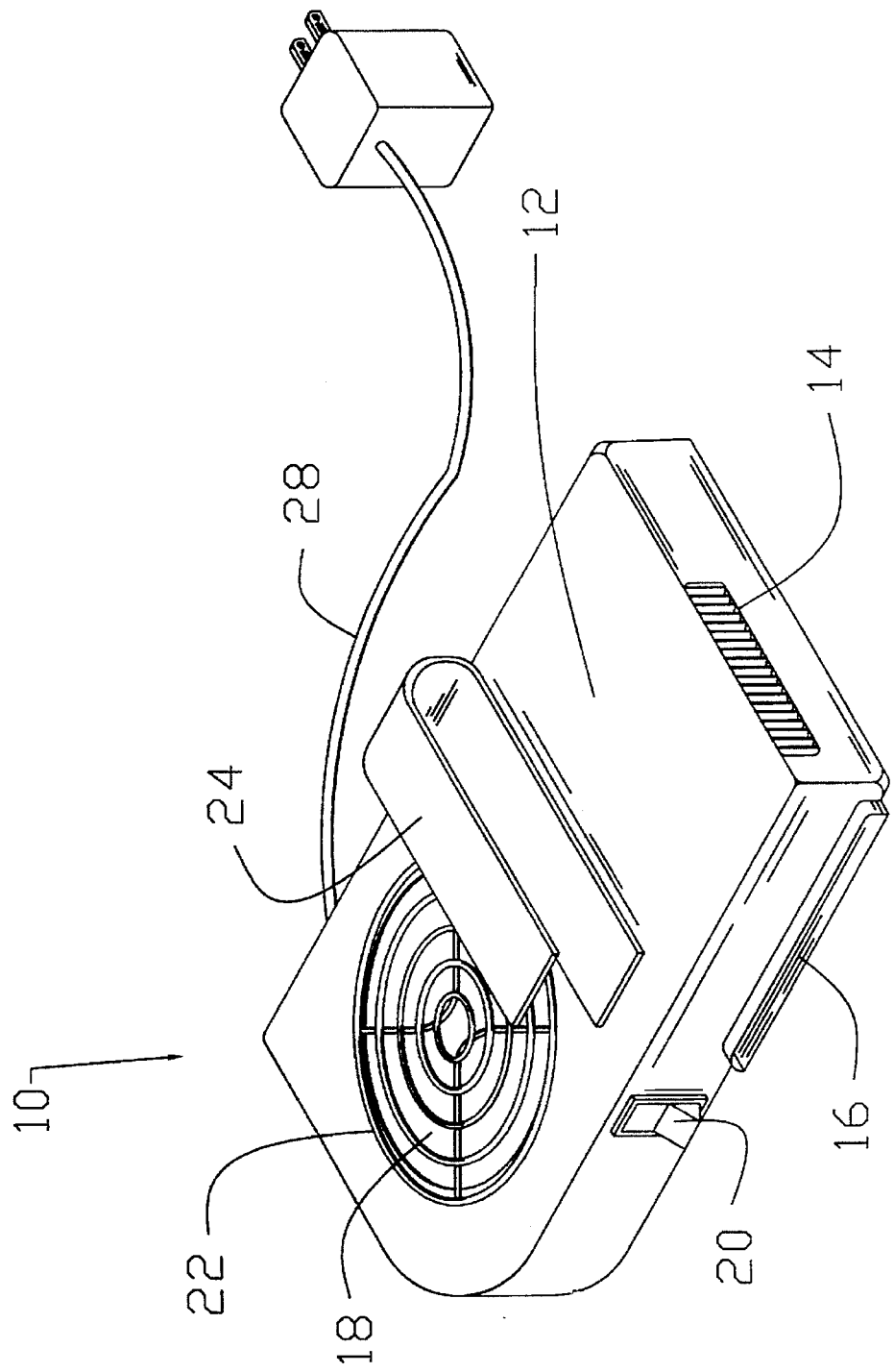
FIG. 6 illustrates an alternate embodiment of the invention of FIG. 1 depicting a household electrical jack which is used to power the device.

Another alternate embodiment of the invention as shown in FIG. 6 employs a standard 120 Volt power plug and transformer. In this configuration the invention would be powered by a conventional wall socket supplying 120 VAC; said transformer is operable to convert to low voltage dc, accommodating use of the invention in the office or home environment.

In summary, there has been provided a device for producing a flow of cooled air. The device includes an enclosure having intake ports for ambient air, an exhaust port for hot air and a discharge port for cold air. The enclosure has disposed therein a blower/motor unit and thermoelectric cooler electrically connected through a ON/OFF switch; said thermoelectric cooler having a heat dissipation side and a heat abstraction side, adhered thereon hot heat sink and a cold heat sink. Air originating from the blower passes through the hot heat sink, is heated, and then exhausted away from the person; while the air passing through the cold heat sink is cooled and blown on the face of a persons subject to heat for the purpose of cooling and personal comfort.

Although the preferred embodiment has been described in detail, it should be understood that various changes, substitutions and alterations can be made therein without departing from the spirit and scope of the invention as defined by the appended claims.

What is claimed is:

1. An apparatus for producing a flow of cooled air, said apparatus comprising,
    a portable enclosure having two ambient air intake ports, one on the top of the enclosure and one on the bottom of the enclosure, a hot air exhaust port and a cold air discharge port;
    an electrical means by which said apparatus is powered;
    a blower/motor assembly mounted within said enclosure adjacent said intake ports which produces an airstream;
    a planar dividing wall placed adjacent to the blower/motor assembly, parallel to the airstream which divides the airstream into a first and second portion;
    a hot heat sink disposed on one side of the dividing wall to transfer heat to the first portion of the airstream;
    a cold heat sink disposed on the opposite side of the dividing wall to transfer heat from the second portion of the airstream;
    a thermoelectric module contained in the dividing wall fixedly attached to the hot heat sink and the cold heat sink.

2. The apparatus of claim 1 including air-filters demountably disposed on said intake ports of said enclosure to filter incoming air.

3. The apparatus of claim 1 wherein said thermoelectric cooling module is operable to pump heat from the second portion of the airstream to the first portion of the airstream, lowering the temperature of said second portion of the airstream for the purpose of maintaining a steady flow of cool air.

4. The apparatus of claim 1 wherein said electrical means is a cigarette lighter jack.

5. The apparatus of claim 1 wherein said electrical means is a standard 120 VAC plug.

6. The apparatus of claim 1 wherein said electrical means is a battery means.

7. The apparatus of claim 1 wherein said hot heat sink has parallel fins in a 'Z' formation to direct air out the exhaust port.

8. The apparatus of claim 1 wherein said cold heat sink has parallel fins in an 'L' formation to direct air out the discharge port.

9. The apparatus of claim 1 wherein an attachment clip is operable to mount the device to a sun shade or other suitable surface.

10. The apparatus of claim 1 wherein said enclosure includes a mounting flange and seal for extending the hot heat sink and one ambient air intake port through a wall, disposing said hot heat sink and one ambient air intake port in the outside ambient air.

* * * * *